United States Patent
Villaron et al.

(10) Patent No.: US 7,783,971 B2
(45) Date of Patent: Aug. 24, 2010

(54) GRAPHIC OBJECT THEMES

(75) Inventors: Shawn A. Villaron, San Jose, CA (US); Nick Robarge, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 99 days.

(21) Appl. No.: 11/479,982

(22) Filed: Jun. 30, 2006

(65) Prior Publication Data

US 2007/0174307 A1 Jul. 26, 2007

Related U.S. Application Data

(63) Continuation-in-part of application No. 11/228,616, filed on Sep. 15, 2005, and a continuation-in-part of application No. 11/228,617, filed on Sep. 15, 2005, and a continuation-in-part of application No. 11/228,867, filed on Sep. 15, 2005.

(60) Provisional application No. 60/716,711, filed on Sep. 13, 2005.

(51) Int. Cl.
G06F 17/30 (2006.01)

(52) U.S. Cl. ........................ 715/248; 707/101

(58) Field of Classification Search .................. 707/101
See application file for complete search history.

(56) References Cited

U.S. PATENT DOCUMENTS

| | | | | |
|---|---|---|---|---|
| 4,498,145 | A | 2/1985 | Baker et al. | 707/202 |
| 5,682,468 | A | 10/1997 | Fortenbery et al. | 345/419 |
| 5,850,507 | A | 12/1998 | Ngai et al. | 714/16 |
| 6,282,547 | B1 | 8/2001 | Hirsch | 707/102 |
| 6,374,251 | B1* | 4/2002 | Fayyad et al. | 707/101 |
| 6,380,954 | B1 | 4/2002 | Gunther | 715/764 |
| 6,493,826 | B1 | 12/2002 | Schofield et al. | 726/22 |
| 6,539,396 | B1* | 3/2003 | Bowman-Amuah | 707/103 R |
| 6,618,851 | B1 | 9/2003 | Zundel et al. | 717/103 |
| 6,654,757 | B1* | 11/2003 | Stern | 707/101 |
| 6,711,577 | B1* | 3/2004 | Wong et al. | 707/101 |
| 6,725,421 | B1 | 4/2004 | Boucher et al. | 715/205 |
| 6,732,090 | B2* | 5/2004 | Shanahan et al. | 707/3 |
| 6,772,170 | B2* | 8/2004 | Pennock et al. | 707/102 |
| 6,778,979 | B2* | 8/2004 | Grefenstette et al. | 707/3 |
| 6,820,075 | B2* | 11/2004 | Shanahan et al. | 707/3 |
| 7,499,955 | B2 | 3/2009 | Kao et al. | 707/202 |
| 2003/0078913 | A1* | 4/2003 | McGreevy | 707/3 |
| 2003/0078935 | A1* | 4/2003 | Zibin et al. | 707/101 |
| 2004/0220954 | A1 | 11/2004 | Zhou et al. | 707/101 |
| 2004/0230888 | A1* | 11/2004 | Kramer et al. | 715/501.1 |
| 2005/0015729 | A1* | 1/2005 | Fernandez et al. | 715/765 |
| 2005/0171967 | A1* | 8/2005 | Yuknewicz et al. | 707/101 |
| 2005/0278625 | A1* | 12/2005 | Wessling et al. | 715/527 |
| 2006/0230311 | A1 | 10/2006 | Kao et al. | 707/202 |
| 2006/0242591 | A1* | 10/2006 | Van Dok et al. | 715/762 |

(Continued)

*Primary Examiner*—Don Wong
*Assistant Examiner*—Kim T Nguyen
(74) *Attorney, Agent, or Firm*—Merchant & Gould, P.C.

(57) ABSTRACT

A common visual appearance can be applied to documents authored by different kinds of applications. Thus, a suite of applications can have a theme that can be applied to differing kinds of documents produced by the different kinds of applications in the suite of applications. The theme information can be stored externally to the produced documents as well as internally to the produced documents. The theme can include visual attributes of the documents as well as content, such as text or other information.

20 Claims, 7 Drawing Sheets

U.S. PATENT DOCUMENTS

| | | | |
|---|---|---|---|
| 2007/0061343 A1 | 3/2007 | Morgan | 707/100 |
| 2007/0061351 A1* | 3/2007 | Villaron et al. | 707/101 |
| 2007/0094607 A1 | 4/2007 | Morgan et al. | 715/762 |
| 2007/0106952 A1* | 5/2007 | Matas et al. | 715/764 |
| 2007/0174307 A1 | 7/2007 | Villaron et al. | 707/100 |

* cited by examiner

GRAPHIC OBJECT THEMES

RELATED APPLICATIONS

The present application is a continuation-in-part of U.S. patent application Ser. No. 11/228,616, filed Sep. 15, 2005, which is incorporated by reference and claims the benefit of the earlier filing date under 35 U.S.C. §120.

The present application is a continuation-in-part of U.S. patent application Ser. No. 11/228,617, filed Sep. 15, 2005, which is incorporated by reference and claims the benefit of the earlier filing date under 35 U.S.C. §120.

The present application is a continuation-in-part of U.S. patent application Ser. No. 11/228,867, filed Sep. 15, 2005, which is incorporated by reference and claims the benefit of the earlier filing date under 35 U.S.C. §120.

This utility patent application claims the benefit under 35 United States Code §119(e) of U.S. Provisional Patent Application No. 60/716,711 filed on Sep. 13, 2005, which is hereby incorporated by reference in its entirety.

Computer Program Listing Appendix

A computer listing is included in a Compact Disc appendix in the attached CD ROM (quantity of two) in IBM-PC using MS-Windows operating system, containing file code.rtf (size 2,567,512 bytes), created on Dec. 28, 06, containing a total of thirty-eight (38) objects as follows:

| Filename | Date of Creation | File Size (bytes) |
| --- | --- | --- |
| oarttx.xsd | Jun. 19, 2006 | 37174 |
| oarttxbullet.xsd | Jun. 19, 2006 | 22482 |
| oarttxchar.xsd | Jun. 19, 2006 | 31741 |
| oarttxmath.xsd | Jun. 19, 2006 | 26757 |
| oarttxpara.xsd | Jun. 19, 2006 | 28282 |
| oarttxrun.xsd | Jun. 19, 2006 | 2119 |
| oartbasestylesheet.xsd | Jun. 19, 2006 | 13878 |
| oartspstyle.xsd | Jun. 19, 2006 | 2547 |
| oartstyledefaults.xsd | Jun. 19, 2006 | 2010 |
| oartstylesheet.xsd | Jun. 19, 2006 | 5436 |
| oartspeffects.xsd | Jun. 30, 2006 | 71697 |
| oartspfillproperties.xsd | Jun. 30, 2006 | 16255 |
| oartspgeometry.xsd | Jun. 30, 2006 | 36082 |
| oartsplineproperties.xsd | Jun. 30, 2006 | 7927 |
| oartsplinestyles.xsd | Jun. 30, 2006 | 22990 |
| oartspmisc.xsd | Jun. 30, 2006 | 2065 |
| oartspproperties.xsd | Jun. 30, 2006 | 3364 |
| oarttable.xsd | Jun. 30, 2006 | 9301 |
| oarttablestyle.xsd | Jun. 30, 2006 | 13978 |
| picturee2o.xsd | Jun. 30, 2006 | 1865 |
| wdtopdr.xsd | Jun. 30, 2006 | 3794 |
| xldr.xsd | Jun. 30, 2006 | 13971 |
| compate2o.xsd | Jun. 30, 2006 | 1954 |
| oartaudiovideo.xsd | Jun. 30, 2006 | 4152 |
| oartbasetypes.xsd | Jun. 30, 2006 | 58142 |
| oartdocprop.xsd | Jun. 30, 2006 | 16366 |
| oartdownrev.xsd | Jun. 30, 2006 | 2394 |
| oarte2o.xsd | Jun. 30, 2006 | 3443 |
| oarte2oanim.xsd | Jun. 30, 2006 | 10930 |
| oarte2oformat.xsd | Jun. 30, 2006 | 2670 |
| oartgvml.xsd | Jun. 30, 2006 | 11851 |
| oartsp3dcamera.xsd | Jun. 30, 2006 | 7472 |
| oartsp3dlight.xsd | Jun. 30, 2006 | 4482 |
| oartsp3dscene.xsd | Jun. 30, 2006 | 1939 |
| oartsp3dsceneplan.xsd | Jun. 30, 2006 | 1937 |
| oartsp3dstyles.xsd | Jun. 30, 2006 | 7487 |
| oartsp.xsd | Jun. 30, 2006 | 5894 |
| oartspb_ut.xsd | Jun. 30, 2006 | 2785 |

BACKGROUND

The extensible markup language (XML) format being introduced and now widely adopted has been transforming the landscape of computer programming. XML has a number of advantages over previous programming languages.

The XML format is considered an accessible format that allows other developers to see the code behind the constructs and build and customize it to their needs. The interoperability of XML programs is also an advantage. Solutions can alter information inside a document or create a document entirely from scratch by using standard tools and technologies capable of manipulating XML.

Individuals and businesses often author documents that have a unique appearance or "look and feel" such that the document style can be used to identify or describe a particular individual or business. Template files for a particular application (such as a word processor) can be used as a starting point so that authors can produce similarly appearing documents using the particular application.

However, it is difficult to apply similar styles for documents authored by different applications (for example, a spreadsheet program and a slide presentation program) because the applications have templates that have different file formats and cannot be used by other programs. The document authors often have to recreate the templates using the differing tools, which often requires a duplication of time and effort and also requires a greater familiarity with the tools being used.

The templates are typically composed of design elements such as color scheme, font scheme, fill, line, shadow, three-dimensional graphics, and the like. Because the template files have different formats, it is often difficult to ensure uniformity between documents authored by differing application types.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The present disclosure is directed to providing common document themes for graphic objects whereby documents authored by different types of applications can have a relatively uniform appearance. Document themes comprise, for example, color schemes, font schemes, formatting schemes, and sets of custom colors. A theme authoring tool can be used to describe elements in a theme file (or a description that can be used to form the theme file).

A particular document theme can be applied to a document authored by a particular application by using a tool in the user interface (UI) of the particular application to select a desired theme. The UI can be dynamically linked at runtime (as in a ".DLL" file) to provide functionality for selecting and editing theme files from within a document authoring application.

A default theme can also be supplied for documents, which use indirection to access colors, fonts, and effects and other theme elements. The UI in the particular application enables a user to select theme colors, theme fonts, and shape styles (such as choosing graphics formats for producing a desired theme). The user can change individual graphical elements (or the entire theme), and the document is typically updated as a result.

Additionally, the changes to the theme file can be "pushed" to application documents (that rely upon the theme file) when the theme file is changed. When a user interface of an application is used to select a theme file, the UI can "associate" the file with the selected theme file such that the associated files can be changed whenever the theme file is changed.

The theme file can be stored in a markup language, such as XML, so that different types of applications can reference the theme file. Accordingly, a common theme (from the theme file, for example) can be applied to documents authored by differing application types. Content (as well as styles) can be propagated across various documents authored by differing application types because the theme file can be used to store content to be used for providing a desired theme to the document.

These and other features and advantages will be apparent from a reading of the following detailed description and a review of the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. Furthermore, various operating systems and applications can be used to provide a system providing thematic graphical objects. The disclosure herein is, therefore, not to be taken in a limiting sense.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
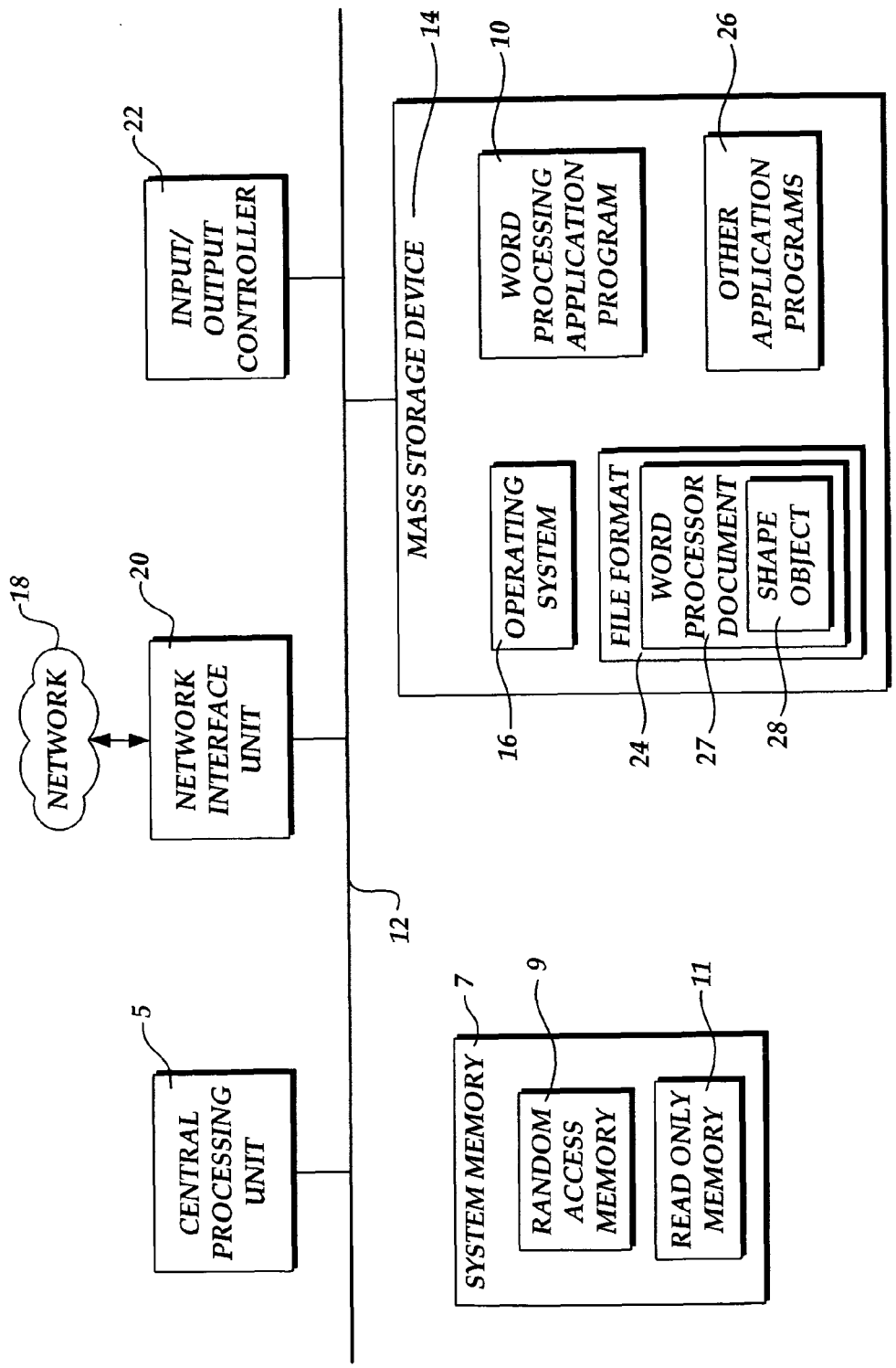
FIG. 1 is a computing system architecture illustrating a computing apparatus utilized in and provided by various illustrative embodiments.

As briefly described above, embodiments are directed to providing common document themes for graphic objects whereby documents authored by different types of applications can have a relatively uniform appearance. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

Referring now to the drawings, in which like numerals represent like elements, various aspects will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer utilized in an embodiment will be described. The computer architecture shown in FIG. 1 illustrates a computing apparatus, such as a server, desktop, laptop, or handheld computing apparatus, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVJS"), or other optical storage, magnetic cassettes, magnetic tape, magnetic disk storage or other magnetic storage devices, or any other medium which can be used to store the desired information and which can be accessed by the computer 2.

According to various embodiments, the computer may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer. The mass storage device 14 and RAM 9 may also store one or more program modules. In particular, the mass storage device 14 and the RAM 9 may store a word processing application program 10. The word processing application program 10 is operative to provide functionality for the creation and structure of a word processor document, such as a document 27, in an open file format 24, such as an XML file format and/or a binary file format. According to one embodiment, the word processing application program 10 and other application programs 26 comprise a suite of application programs including word processor, spreadsheet, and slide-presentation authoring application programs.

Embodiments greatly simplify and clarify the organization of document features and data. The word processing program 10 organizes the 'parts' of a document (features, data, themes, styles, objects, and the like) into logical, separate pieces, and then expresses relationships among the separate parts. These relationships, and the logical separation of 'parts' of a document, make up a new file organization that can be easily accessed, such as by a developer's code. It should be understood that the following description is made in terms of a word processing program 10 and associated documents, but that embodiments are equally applicable to other applications and associated documents, for example, spreadsheet applications and documents, slide presentation applications and documents, and the like.

Figure 2A:
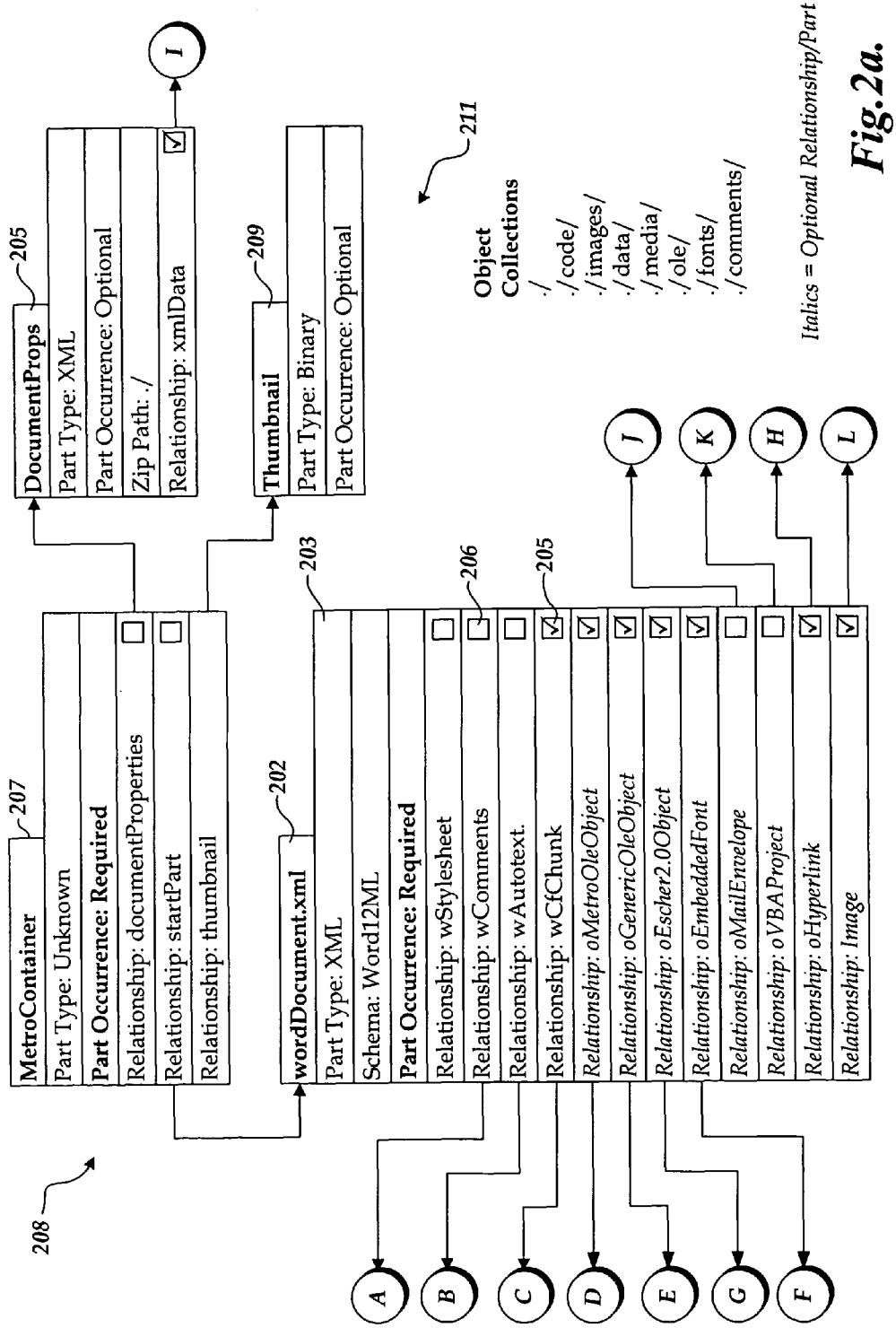
FIGS. 2a-2c are block diagrams illustrating a document relationship hierarchy for various modular parts utilized in a file format for representing a word processor document according to various illustrative embodiments.
Figure 2B:
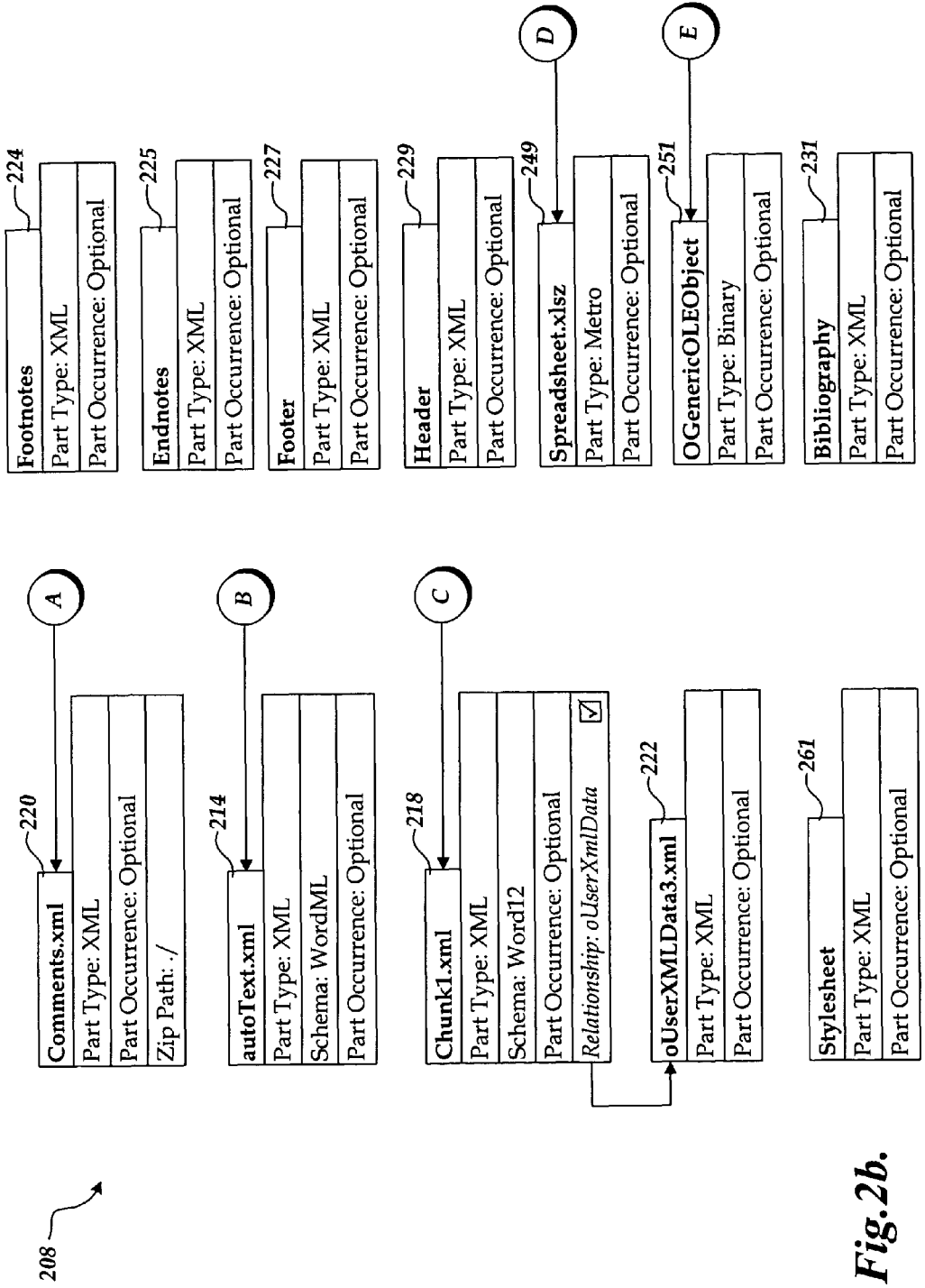
Figure 2C:
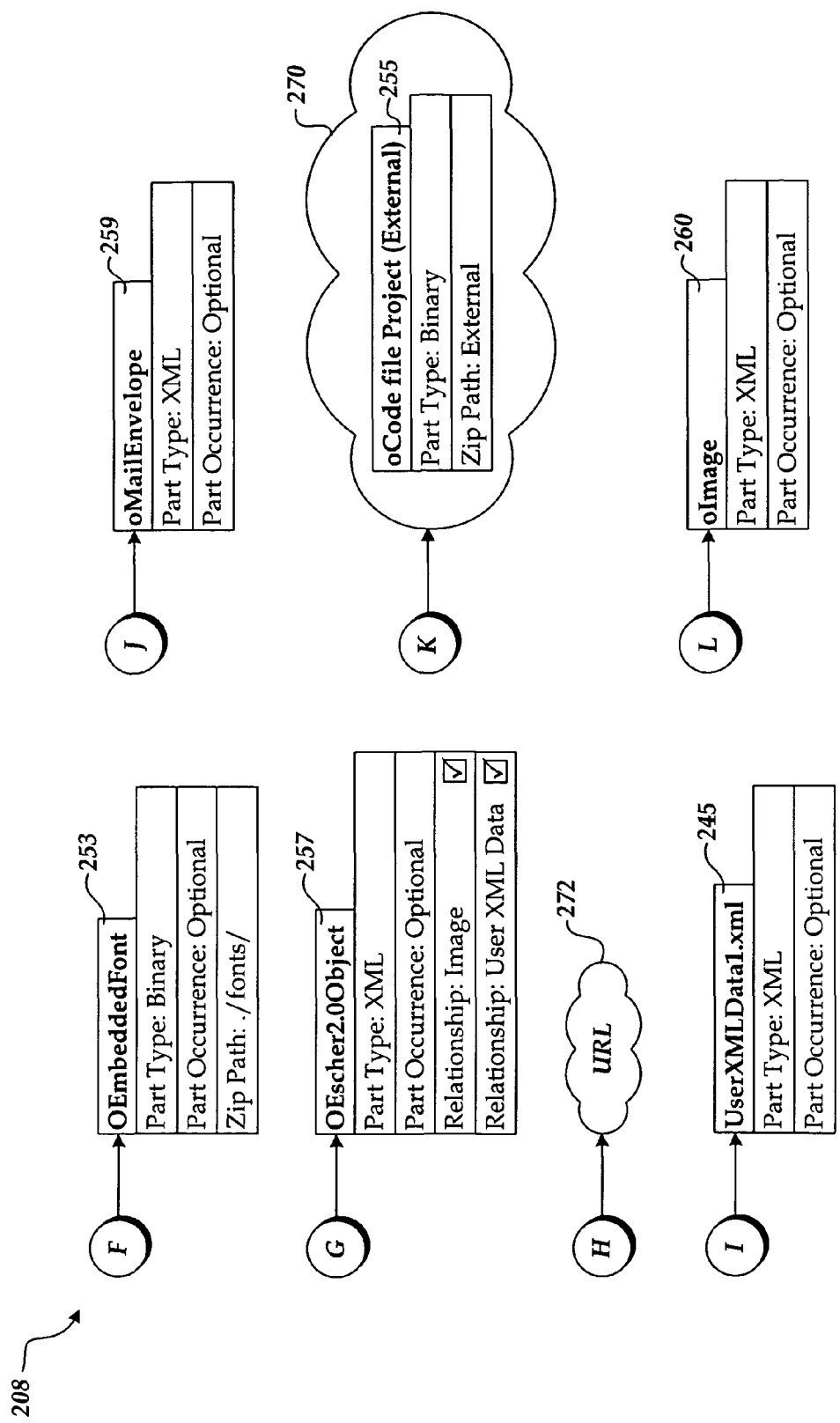

Referring now to FIGS. 2a-2c, block diagrams illustrating a word processor document relationship hierarchy 208 for various modular parts utilized in the file format 24 for representing a document according to various illustrative embodiments will be described. The word processor document relationship hierarchy 208 lists specific file format relationships, some with an explicit reference indicator 205 indicating an explicit reference to that relationship in the content of the modular part, for example via a relationship identifier. An example of this would be an image part 260 referenced by a parent or referring part that references the modular parts with which the parent part has a relationship. In some embodiments, it may not be enough to just have the relationship to the image part 260 from a parent or referring modular part, for example from a document part 202. The parent part may also need to have an explicit reference to that image part relationship inline so that it is known where the image goes. Non-explicit indicators 206 indicate that a referring modular part is associated, but not called out directly in the parent part's content. An example of this would be a theme object and/or stylesheet 261 where it is implied that there is always a stylesheet associated, and therefore there is no need to call out the stylesheet 261 in the content. The stylesheet 261 can be found by merely looking for a relationship of that type. Optional relationships with respect to validation are indicated in italics.

The various modular parts or components of the presentation (for use by a word processor, for example) hierarchy 208 are logically separate but are associated by one or more relationships. Each modular part is also associated with a relationship type and is capable of being interrogated separately and understood with or without the word processing application program 10 and/or with or without other modular parts being interrogated and/or understood. Thus, for example, it is easier to locate the contents of a document because instead of searching through all the binary records for document information, code can be written to easily inspect the relationships in a document and find the document parts effectively ignoring the other features and data in the file format 24. Thus, the code is written to step through the document in a much simpler fashion than previous interrogation code. Therefore, an action such as removing all the images, while tedious in the past, is now less complicated.

A modular content framework may include a file format container 207 associated with the modular parts. The modular parts include the document part 202 operative as a guide for properties of the document. The document hierarchy 208 may also include a document properties part 205 containing built-in properties associated with the file format 24, and a thumbnail part 209 containing a thumbnail associated with the file format 24. It should be appreciated that each modular part is capable of being extracted from or copied from the document and reused in a different document along with associated modular parts identified by traversing relationships of the modular part reused. Associated modular parts are identified when the word processing application 10 traverses inbound and outbound relationships of the modular part reused.

Aside from the use of relationships in tying parts together, there is also a single part in every file that describes the content types for each modular part. This gives a predictable place to query to find out what type of content is inside the file. While the relationship type describes how the parent part will use the target part (such as "image" or "stylesheet"), the content or part type 203 describes what the actual modular part is (such as "JPEG" or "XML") regarding content format. This assists both with finding content that is understood, as well as making it easier to quickly remove content that could be considered unwanted (for security reasons, etc.). The key to this is that the word processing application must enforce that the declared content types are indeed correct. If the declared content types are not correct and do not match the actual content type or format of the modular part, the word processing application should fail to open the modular part or file. Otherwise potentially malicious content could be opened.

Referring to FIG. 2b, other modular parts may include a comments part 220 containing comments associated with the document, an autotext part 214, for example a glossary containing definitions of a variety of words associated with the document, and a chunk part 218 containing data associated with text of the document. Still further, the modular parts may include a user data part 222 containing customized data capable of being read into the document and changed, a footnote part 224 containing footnotes associated with the document, and an endnote part 225 containing endnotes associated with the document.

Other modular parts include a footer part 227 containing footer data associated with the document, a header part 229 containing header data associated with the document and a bibliography part 231 containing bibliography data and/or underlying data of a bibliography associated with the document. Still further, the modular parts may include a spreadsheet part 249 containing data defining a spreadsheet object associated with the document, an embedded object part 251 containing an object associated with the document, and a font part 253 containing data defining a font associated with the document.

Referring to FIG. 2c, the modular parts also include a drawing object part 257 containing an object associated with the document where the drawing object is built using a drawing platform, a mail envelope part 259 containing envelope data where a user of the document has sent the document via electronic mail, a code file part 255 containing code associated with the document where the code file part is capable of being accessed via an external link 270, and a hyperlink part 272 containing a hyperlink associated with the document where the hyperlink part 272 includes a uniform resource locator.

Other modular parts may also include an embedded object part 253 containing an object associated with the document, a second user data part 245 containing customized data capable of being read into the file format container and changed. As an example, embodiments make it easier for a programmer/developer to locate an embedded object in a document because any embedded object has an embedded object part 253 separate in the file format 24 with corresponding relationships expressed. The embedded object part 253 as are other modular parts, is logically broken-out and separate from other features & data of the document. It should be appreciated that modular parts that are shared in more than one relationship are typically only written to memory once. It should also be appreciated that certain modular parts are global and thus, can be used anywhere in the file format. In contrast, some modular parts are non-global and thus, can only be shared on a limited basis.

In various embodiments, the file format 24 may be formatted according to extensible markup language ("XML") and/or a binary format. As is understood by those skilled in the art, XML is a standard format for communicating data. In the XML data format, a schema is used to provide XML data with a set of grammatical and data type rules governing the types and structure of data that may be communicated. The XML data format is well-known to those skilled in the art, and therefore not discussed in further detail herein. The XML formatting closely reflects the internal memory structure. Thus, an increase in load and save speed is evident.

Embodiments allow documents to be more programmatically accessible. This enables a significant number of new uses that are simply too hard for previous file formats to accomplish. For example, a server-side program is able to create a document for someone based on their input, or to create a report on Company A for the time period of Jan. 1, 2004-Dec. 31, 2004.

FIGS. 2a-2c also include relationship types utilized in the file format 24 according to various illustrative embodiments. The relationship types associated with the modular parts not only identify an association or dependency but also identify the basis of the dependency. The relationship types include the following: a code file relationship capable of identifying potentially harmful code files, a user data relationship, a hyperlink relationship, a comments relationship, an embedded object relationship, a drawing object relationship, an image relationship, a mail envelope relationship, a document properties relationship, a thumbnail relationship, a glossary relationship, a chunk relationship, a stylesheet/them relationship and a spreadsheet relationship.

Referring to FIG. 2a also illustrates the listing 211 that lists collection types for organizing the modular parts. The collection types include a code collection including the code file part 255, an images collection including the drawing object part 257, and a data part including the user data part 222. The collection types also include an embeddings collection including the embedded object part 251, a fonts collection including the font part 253, and a comments collection including the comments part 220, the footnote part 224, the endnote part 225, the footer part 227, the header part 229, and/or the bibliography part 231.

Figure 3:
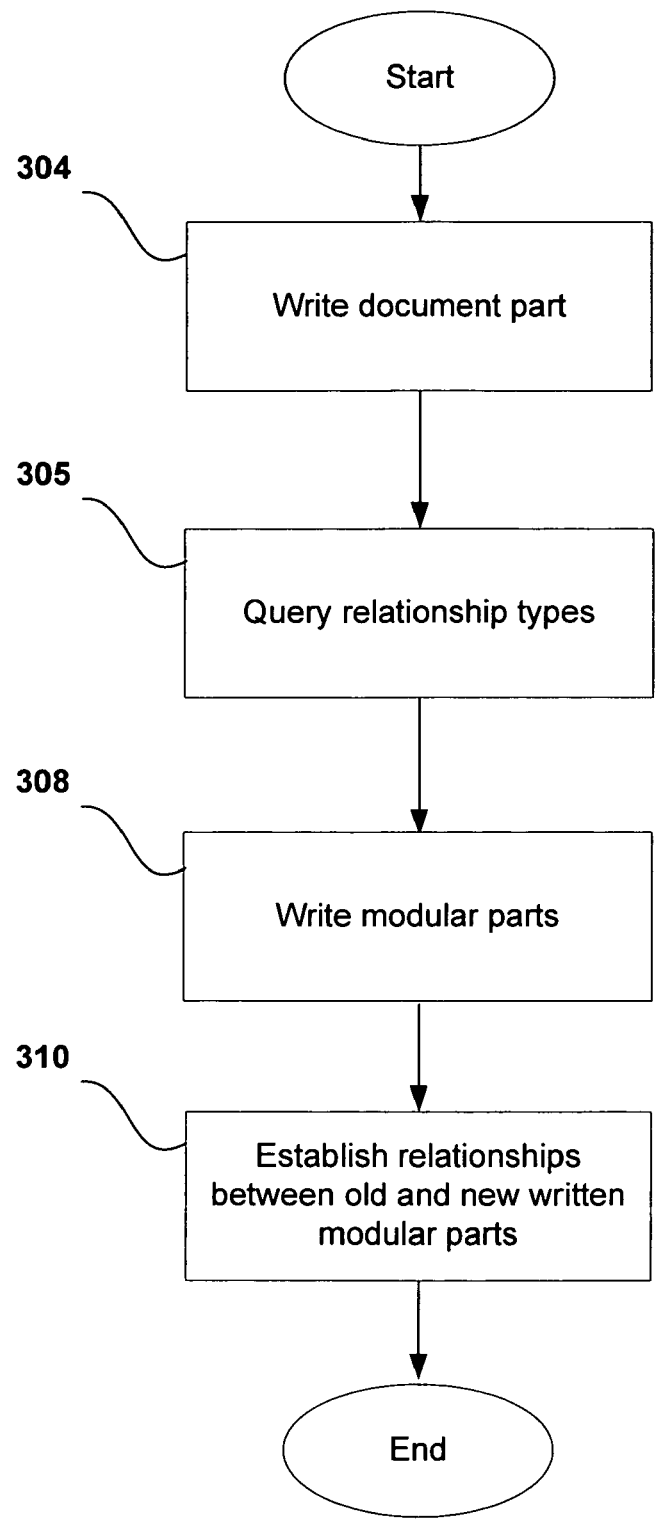
FIGS. 3-5 are illustrative routines performed in representing documents in a modular content framework according to illustrative embodiments.
Figure 4:
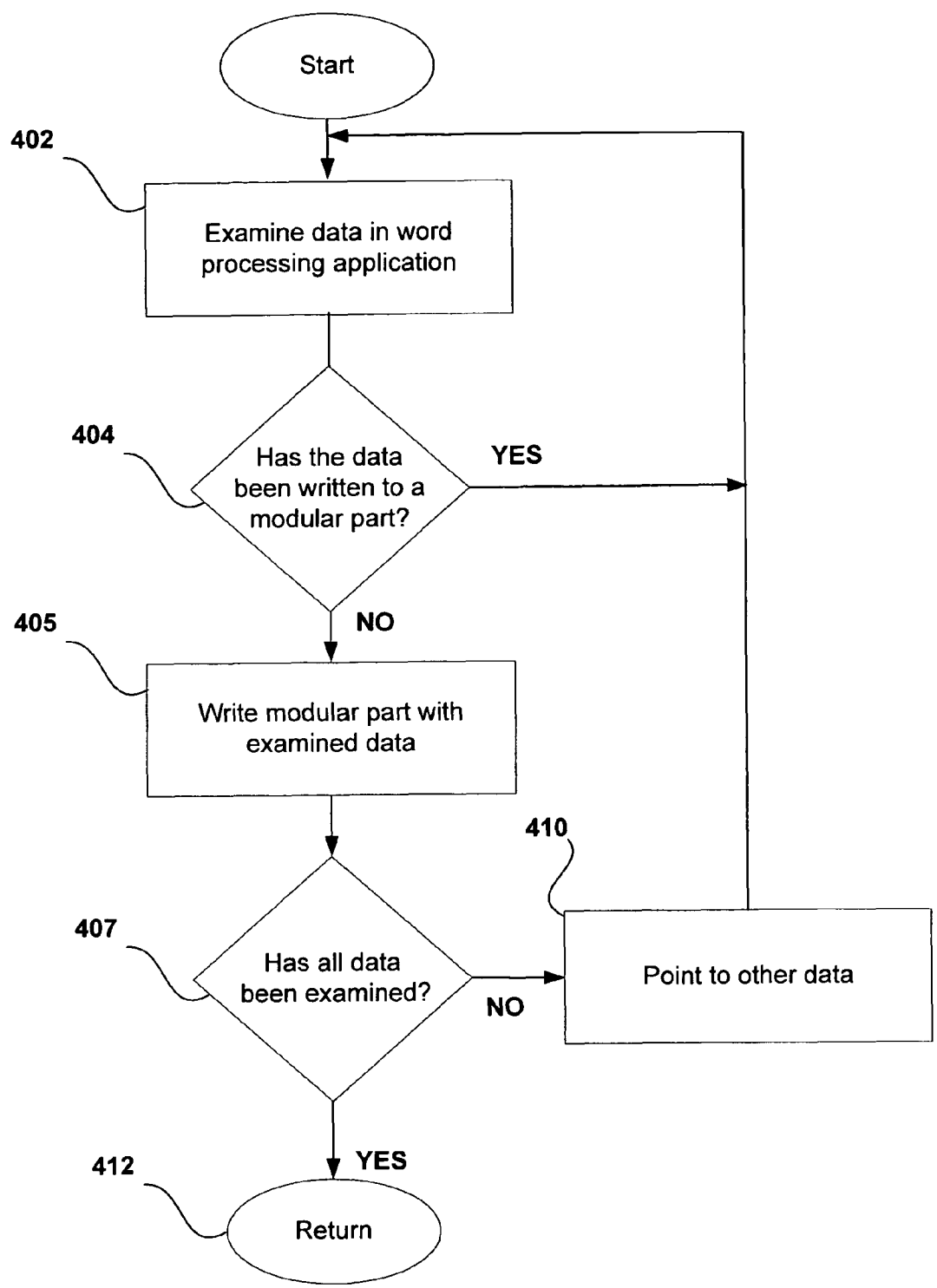
Figure 5:
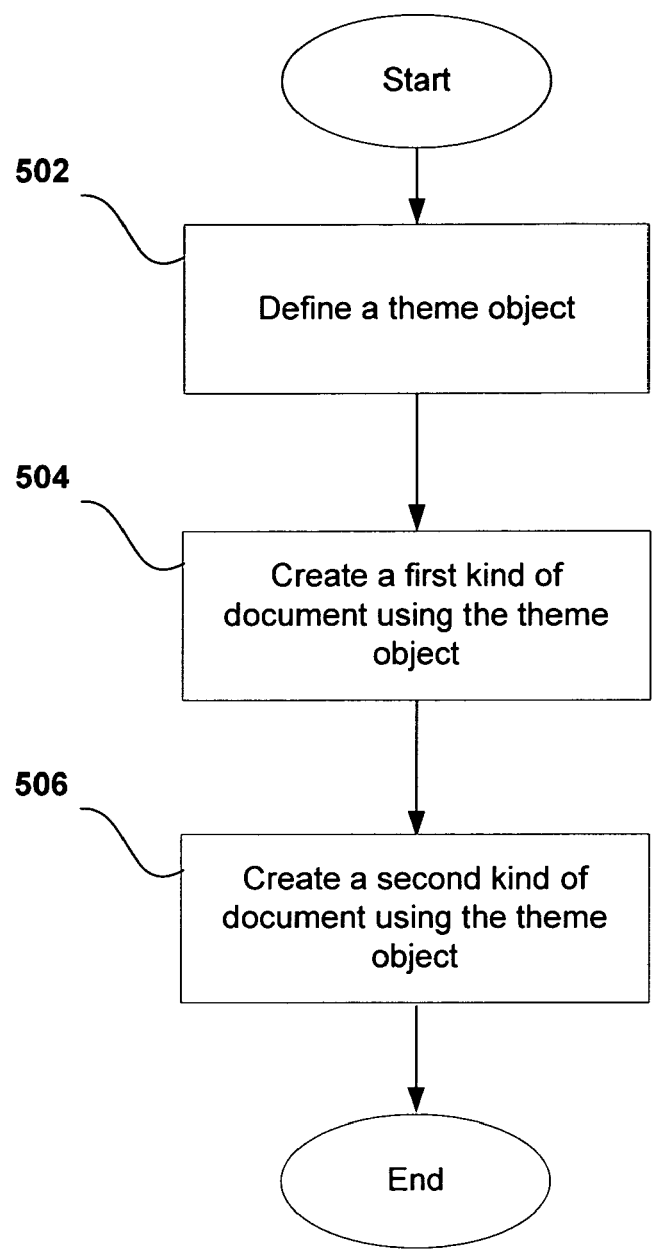

FIGS. 3-5 are illustrative routines performed in representing documents in a modular content framework according to illustrative embodiments. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the implementing computing system. Accordingly, the logical operations illustrated in FIGS. 3-4, and making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof.

Referring now to FIGS. 2a-2c and 3, the routine 300 begins at operation 304, where the word processing application program 10 writes the document part 202. The routine 300 continues from operation 304 to operation 305, where the word processing application program 10 queries the document for relationship types to be associated with modular parts logically separate from the document part but associated with the document part by one or more relationships. Next, at operation 308, the word processing application 10 writes modular parts of the file format separate from the document part. Each modular part is capable of being interrogated separately without other modular parts being interrogated and understood. Any modular part to be shared between other modular parts is typically written only once. The routine 300 then continues to operation 310.

At operation 310, the word processor application 10 establishes relationships between newly written and previously written modular parts. The routine 300 then terminates at the return operation.

Referring now to FIG. 4, the routine 400 for writing modular parts will be described. The routine 400 begins at operation 402 where the word processing application 10 examines data in the word processing application. The routine 400 then continues to detect operation 404 where a determination is made as to whether the data has been written to a modular part. When the data has not been written to a modular part, the routine 400 continues from detect operation 404 to operation 405 where the word processing application writes a modular part including the data examined. The routine 400 then continues to detect operation 407 described below.

When at detect operation 404, the data examined has been written to a modular part, the routine 400 continues from detect operation 404 to detect operation 407. At detect operation 407 a determination is made as to whether all the data has been examined. If all the data has been examined, the routine 400 returns control to other operations at return operation 412. When there is still more data to examine, the routine 400 continues from detect operation 407 to operation 410 where the word processing application 10 points to other data. The routine 400 then returns to operation 402 described above.

Referring now to FIG. 5, the routine 500 for writing theme parts will be described. The routine 500 begins at operation 502 where the process defines a theme object for conveying theme elements to a first and second document. At step 504, the first document is typically created using an application within an application suite. At step 506, the second document is typically created using an application in the application suite that is different from the application used to create the first document. For example, the first document can be created by using a word processor (as described above) and the second document can be created using a spreadsheet program, where the word processor and the spreadsheet can be included in an application suite. Other applications such as database programs and slide authoring programs can be included as well.

In various embodiments, a user interface (UI) can be provided for defining (including editing) and/or selecting the theme object. The theme object is used to convey theme elements such as colors, fonts, and formatting of a document. For example, the theme object can be used to specify foreground and background colors of a document. Likewise, objects within the document can be controlled through style elements such as a fill command. Accordingly, the theme object can be used so that documents produced by differing applications can have a common appearance in accordance with the theme.

The UI can also be used to associate theme objects with the documents. For example, the theme object can be included in a document and saved in a markup language such as XML. In addition, the theme object can be instantiated and stored externally to the document such that when the theme object is edited, documents having been associated with the now-edited theme object can be automatically updated with the theme object. A document can also be associated with a default theme object.

Theme objects can also be used to hold content (such as company logos, legal notices, product identifiers, and the like). The content can then be displayed in documents that are associated with the theme object. When cutting and pasting content (from the theme object or otherwise) displayed in a document that is associated with a theme object, information from the theme object (or, for example, a pointer to the theme object) can be placed on the clipboard.

The above specification, examples and data provide a complete description of the manufacture and use of embodiments. Since many embodiments can be made without departing from the spirit and scope of the invention, the invention resides in the claims hereinafter appended.

We claim:

1. A computer-implemented method for providing thematic information to provide a visual theme for documents, comprising:
    defining a theme object for conveying theme elements to documents; wherein the theme object is defined using a markup language and stored in a theme file; wherein the definition of the theme object in the theme file is maintained separately from other objects that define the document; wherein the other objects comprise: a features part; a data part; and a styles part; wherein the theme object definition includes properties that can be shared and overridden in a hierarchical manner; wherein a schema defines and enforces rules for displaying the theme object;
    using a first application to author a first document and associating the theme object in the theme file with the first document; wherein the first document is associated with a first file format that includes modular parts that are associated together via a first document relationship hierarchy; wherein the theme object is a modular part that is associated with the first file format via the first document relationship hierarchy; and
    using a second application that is different from the first application to author a second document and associating the theme object in the theme document with the second document wherein the second document is associated with a second file format that includes modular parts that are associated together via a second document relationship hierarchy; wherein the theme object is a modular part that is associated with the second file format via the second document relationship hierarchy, such that a single theme object is associated with multiple file formats and documents; wherein associating the theme object in the theme document with the first document and the second document applies the theme elements to the first document and the second document such that the first document and the second document have a common appearance.

2. The method of claim 1 wherein the first and second applications are in an application suite.

3. The method of claim 1 wherein the theme elements comprise information for colors, fonts, and formatting of a document.

4. The method of claim 3 wherein the color information comprises information for foreground and background colors.

5. The method of claim 1 wherein the theme elements comprise information for graphic object fills.

6. The method of claim 1 further comprising providing a user interface (UI) for defining the theme object.

7. The method of claim 1 further comprising providing a user interface (UI) for selecting the theme object.

8. The method of claim 1 further comprising storing theme object information in the first and second documents.

9. The method of claim 8 further comprising providing a user interface (UI) for associating the first and second documents with the theme object.

10. The method of claim 9 further comprising changing the theme object information in the first and second documents when a change is made to the theme object.

11. The method of claim 1 wherein the defining a theme object comprises using a default theme object to instantiate the theme object being defined.

12. The method of claim 1 wherein the defining a theme object comprises editing the theme object being defined.

13. The method of claim 1 wherein the theme object further comprises content information.

14. The method of claim 13 wherein the content information is displayed in the first and second documents.

15. The method of claim 1 further comprising copying theme object information to a clipboard when a portion of the first document is copied to the clipboard.

16. A system for providing thematic information to provide a visual theme for documents, comprising:
    a computer readable storage medium encoded with a theme object for conveying thematic information for visual display of documents; wherein the theme object is defined using a markup language and is stored in a theme file; wherein the definition of the theme object is maintained separately within the theme file from other objects that define the document and that are each maintained separately; and wherein a schema defines and enforces rules for displaying the theme object;
    an operating system executed on a processor; wherein the operating system provides an application programming interface (API) to the theme object;
    an application suite executed on a processor; wherein the application suite comprises a first application for authoring a first kind of document using the API to the theme object, and comprising a second application that is different from the first application for authoring a second kind of document using the API to the theme object; wherein the first kind of document is associated with a first file format that includes modular parts that are associated together; wherein the theme object is a modular part that is associated with the first file format; wherein the second kind of document is associated with a second file format that includes modular parts that are associated together; wherein the theme object is a modular part that is associated with the second file format; wherein the theme object provides a common appearance for the first kind of document and the second kind of document.

17. The system of claim 16 wherein the first application is a spreadsheet application and the second application is a word processing application.

18. A tangible medium comprising computer-executable instructions for conveying theme elements to a plurality of documents; comprising:

associating a theme object with a first document authored by a spreadsheet application; wherein the first document is associated with a spreadsheet file format that includes modular parts that are associated together; wherein the theme object is a modular part that is associated with the spreadsheet file format; wherein the theme object is defined using a markup language; wherein the definition of the theme object is maintained separately from other objects that define the spreadsheet file and that are each maintained separately; and wherein a schema defines and enforces rules for displaying the theme object;

associating the theme object with a second document authored by a word processing application; wherein the second document is associated with a word processing file format that includes modular parts that are associated together; wherein the theme object is a modular part that is associated with the word processing file format; and associating the theme object with a third document authored by a slide presentation application; wherein the second document is associated with a slide presentation file format that includes modular parts that are associated together; wherein the theme object is a modular part that is associated with the slide presentation file format; wherein associating the theme object with the first document, the second document, and the third document provides a common appearance for the first document and the second document and the third document.

19. The tangible medium of claim 18 the instructions further comprising storing the first, second and third documents in a markup language.

20. The tangible medium of claim 19 wherein the markup language is XML.

* * * * *